(12) United States Patent
Li et al.

(10) Patent No.: US 11,611,364 B1
(45) Date of Patent: Mar. 21, 2023

(54) MILLIMETER-WAVE ISOLATION DEVICE

(71) Applicant: DECO Integration Technology Co., Limited, Shenzhen (CN)

(72) Inventors: Cheng Li, Shenzhen (CN); Tso Wei Li, Shenzhen (CN)

(73) Assignee: DECO Integration Technology Co., Limited, Shenzhen (CN)

( * ) Notice: Subject to any disclaimer, the term of this patent is extended or adjusted under 35 U.S.C. 154(b) by 0 days.

(21) Appl. No.: 17/970,222

(22) Filed: Oct. 20, 2022

(51) Int. Cl.
  H04B 1/10 (2006.01)
  H04B 1/38 (2015.01)
  H04B 1/04 (2006.01)
  H04B 1/00 (2006.01)

(52) U.S. Cl.
  CPC ............. *H04B 1/38* (2013.01); *H04B 1/0007* (2013.01); *H04B 1/0458* (2013.01); *H04B 1/0475* (2013.01); *H04B 1/10* (2013.01); *H04B 2001/0408* (2013.01)

(58) Field of Classification Search
  CPC ...... H04B 1/10; H04B 1/0007; H04B 1/0458; H04B 1/0475
  See application file for complete search history.

(56) References Cited

U.S. PATENT DOCUMENTS

| 2011/0053525 A1* | 3/2011 | Yi | G06K 7/0008 455/83 |
| 2013/0102357 A1* | 4/2013 | Vance | H01Q 1/50 343/857 |
| 2015/0044977 A1* | 2/2015 | Ramasamy | H01Q 1/44 455/77 |
| 2021/0058110 A1* | 2/2021 | Zhang | H04B 1/582 |
| 2021/0143861 A1* | 5/2021 | Lee | H03H 19/002 |
| 2022/0344820 A1* | 10/2022 | Fan | G01R 31/58 |

FOREIGN PATENT DOCUMENTS

| CN | 2 032 50 166 U | 10/2013 |
| CN | 1 090 04 321 A | 12/2018 |
| CN | 2094 46 786 U | 9/2019 |

* cited by examiner

*Primary Examiner* — Thanh C Le
(74) *Attorney, Agent, or Firm* — Nitin Kaushik

(57) ABSTRACT

The present invention discloses a millimeter-wave isolation device, comprising a first isolated circuit and a second isolated circuit and further comprising a millimeter-wave transceiver. An output end of the first isolated circuit is connected to an input end of the millimeter-wave transceiver. An output end of the millimeter-wave transceiver is connected to an input end of the second isolated circuit. The first isolated circuit and the second isolated circuit are isolated by virtue of the millimeter-wave transceiver. By adopting a short distance transmission mode with millimeter-waves taken as carrier waves, a bandwidth can reach 200 kHz to 20 GHz, and a transmission speed can reach 100 kbps to 10 Gbps. The speed is high, whereby the millimeter-wave isolation device can be applicable to any scenario. A millimeter-wave carrier wave antenna is small, and through the antenna, either wireless transmission or signal isolation can be achieved.

11 Claims, 12 Drawing Sheets

MILLIMETER-WAVE ISOLATION DEVICE

CROSS-REFERENCE TO RELATED APPLICATIONS

The application claims priority to Chinese patent application No. 202211132475.7, filed on Sep. 17, 2022, the entire contents of which are incorporated herein by reference.

FIELD OF TECHNOLOGY

The present invention relates to a signal isolation device, particularly to a millimeter-wave isolation device.

BACKGROUND

A high voltage circuit is widely applied in our daily life, for example, an electric power supply circuit, a motor driven circuit and the like. A battery rapid charge technology used by a handheld device is even a classical application of the high voltage circuit.

In a typical high voltage circuit, the high voltage circuit is usually composed of a low voltage field and a high voltage field. The low voltage field is usually used for generating trigger signals and digital signals, and the high voltage field is usually the high voltage circuit such as a charging circuit, a motor circuit or a special high voltage device (GaN, SiC, LDMOS). It is needed to transfer signals between the high voltage field and the low voltage field, and a high isolation degree is needed to prevent the high voltage field from damaging the low voltage field. Usually, the device for transferring signals and playing an isolation role is called a switch or an isolator.

As shown in FIG. 1, a current mainstream isolator includes a photo coupler, a capacitive coupling circuit or a coil (inductive) coupling circuit. However, the photo coupler needs other independent devices, the capacitive circuit needs a special oxide layer material, and the coil inductive circuit has a problem of area. Therefore, under the demand of fast response time, low delay and high broadband digital signal processing of a novel high voltage circuit, the above-mentioned three isolators cannot meet the demand. Moreover, the novel high voltage circuit further has another strict requirement, i.e., after high voltage damage, there is no short circuit. A coil and a capacitor both have potential short circuit phenomena.

SUMMARY

The present invention is intended to provide a millimeter-wave isolation device, which guarantees efficient and safe transmission of signals while achieving signal isolation.

In order to solve the above-mentioned technical problem, the present invention adopts a technical solution as follows:

a millimeter-wave isolation device includes a first isolated circuit and a second isolated circuit and further includes a millimeter-wave transceiver, where an output end of the first isolated circuit is connected to an input end of the millimeter-wave transceiver; and an output end of the millimeter-wave transceiver is connected to an input end of the second isolated circuit.

The present invention has the beneficial effects that the first isolated circuit and the second isolated circuit are isolated by virtue of the millimeter-wave transceiver; by adopting a short distance transmission mode with millimeter-waves taken as carrier waves, a bandwidth can reach 200 kHz to 20 GHz, and a transmission speed can reach 100 kbps to 10 Gbps. The speed is high, whereby the millimeter-wave isolation device can be applicable to any scenario. A millimeter-wave carrier wave antenna is small, and through the antenna, either wireless transmission or signal isolation can be achieved without a photo coupler or an extra isolation layer. Moreover, even if a product is broken through, the antenna will not lead to metal short circuit, so that it can be guaranteed that signals feature high transmission speed, small delay and high efficiency while good isolation is achieved, and it is safer.

DESCRIPTION OF THE EMBODIMENTS

In order to describe the technical content, the achieved objective and effect of the present invention in detail, description will be made below in combination with implementation modes and in cooperation with drawings.

Figure 1:
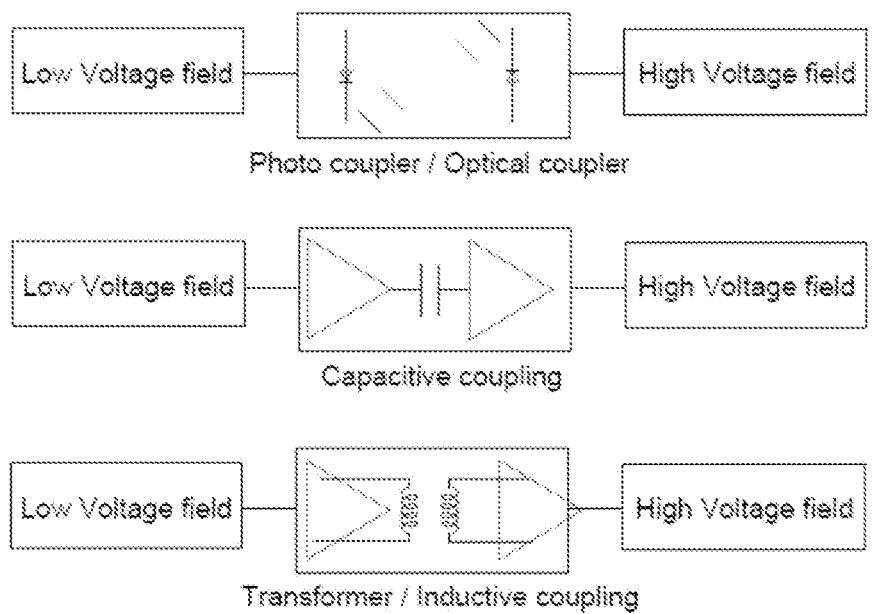
FIG. 1 is a schematic structural diagram of three common circuits that achieve high and low voltage isolation in the prior art.
Figure 2:
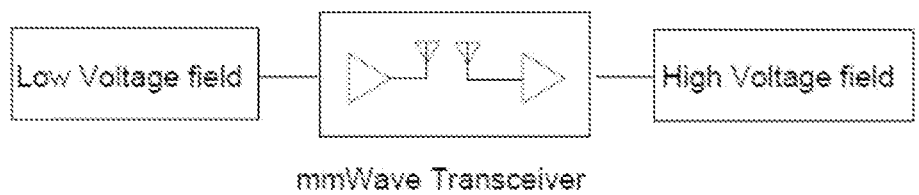
FIG. 2 is a schematic structural diagram of a millimeter-wave isolation device according to an embodiment of the present invention.

The above-mentioned millimeter-wave isolation device of this application can be applicable to various circuits needing signal isolation, for example, isolation between a low voltage field circuit and a high voltage field circuit in a high voltage circuit. Isolation between control signal circuits in upper and bottom bridges of a high voltage bridge circuit and a high voltage device and isolation between a digital logic control circuit and a feedback circuit in a switch power supply are described below through specific implementation modes:

In an optional implementation mode, as shown in FIG. 2, a millimeter-wave isolation device includes a first isolated circuit and a second isolated circuit and further includes a millimeter-wave transceiver. In the implementation mode, the first isolated circuit is a low voltage field circuit of a high voltage circuit, and the second isolated circuit is a high voltage field circuit of the high voltage circuit;

an output end of the first isolated circuit is connected to an input end of the millimeter-wave transceiver; and an output end of the millimeter-wave transceiver is connected to an input end of the second isolated circuit;

where the millimeter-wave transceiver includes a millimeter-wave transmitting circuit, a millimeter-wave receiving circuit, a transmitting antenna and a receiving antenna;

the output end of the first isolated circuit is connected to an input end of the millimeter-wave transmitting circuit;

an output end of the millimeter-wave transmitting circuit is connected to the transmitting antenna;

an input end of the millimeter-wave transmitting circuit is connected to the receiving antenna; and an output end of the millimeter-wave receiving circuit is connected to the input end of the second isolated circuit.

Figure 3:
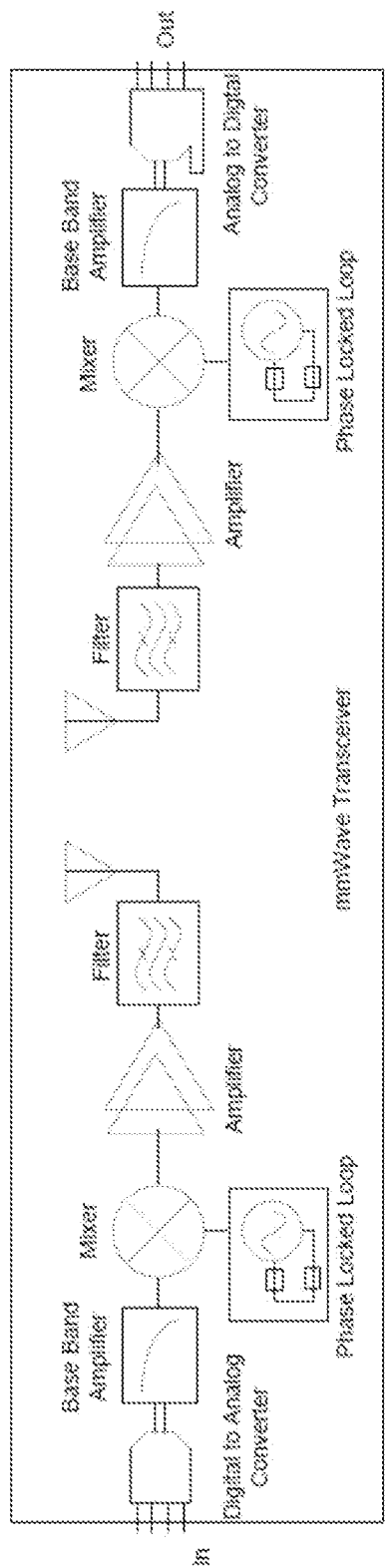
FIG. 3 is a schematic structural diagram of a first circuit of a millimeter-wave transceiver in a millimeter-wave isolation device according to an embodiment of the present invention.

In another optional implementation mode, as show in FIG. 3, the millimeter-wave transmitting circuit includes a digital to analog converter, a first base band amplifier, a first mixer, a first phase locked loop, a first radio frequency amplifier and a first filter;

the millimeter-wave receiving circuit includes a second filter, a second radio frequency amplifier, a second mixer, a second phase locked loop, a second base band amplifier and a digital to analog converter;

an input end of the digital-to-analog converter is connected to the output end of the first isolated circuit and an output end thereof is connected to a first input end of the first mixer;

a second input end of the first mixer is connected to an output end of the first phase locked loop and an output end thereof is connected to a first input end of the second radio frequency amplifier;

an output end of the first radio frequency amplifier is connected to an input end of the first filter;

an output end of the first filter is connected to the transmitting antenna;

an input end of the second filter is connected to the receiving antenna and an output end thereof is connected to a first input end of the second mixer;

a second input end of the second mixer is connected to an output end of the second phase locked loop and an output end thereof is connected to an input end of the second base band amplifier;

an output end of the second base band amplifier is connected to an input end of the analog digital converter; and the output end of the analog digital converter is connected to the input end of the second isolated circuit.

In the implementation mode, the low voltage field signal subjected to digital to analog conversion is mixed with a signal provided by the phase locked loop and pushes together with the amplifier the transmitting antenna to transmit a signal, and the receiving antenna receives the signal, the signal is amplified by the amplifier, and finally, the signal is reduced by virtue of digital to analog conversion and enters the high voltage field.

Figure 4:
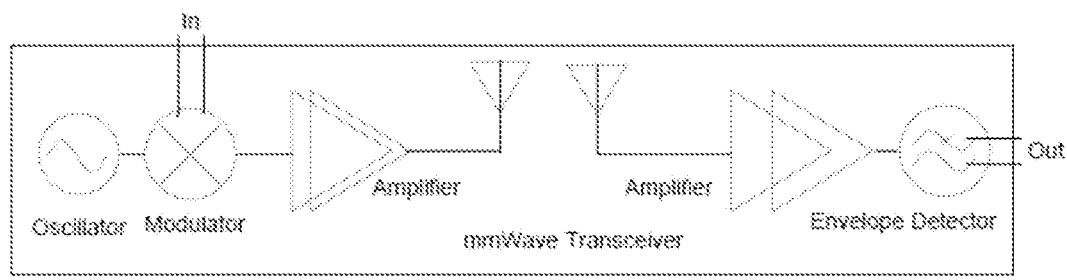
FIG. 4 is a schematic structural diagram of a second circuit of a millimeter-wave transceiver in a millimeter-wave isolation device according to an embodiment of the present invention.

In another optional implementation mode, as show in FIG. 4, the millimeter-wave transmitting circuit includes an oscillator, a modulator and a third radio frequency amplifier;

the millimeter-wave receiving circuit includes a fourth radio frequency amplifier and an envelope detector;

an output end of the oscillator is connected to a first input end of the modulator;

a second input end of the modulator is connected to an output end of the first isolated circuit and an output end thereof is connected to an input end of the third radio frequency amplifier;

an output end of the third radio frequency amplifier is connected to the transmitting antenna;

an input end of the fourth radio frequency amplifier is connected to the receiving antenna and an output end thereof is connected to an input end of the envelope detector; and an output end of the envelope detector is connected to the input end of the second isolated.

In the implementation mode, the low voltage field signal enters the modulator for signal modulation, is amplified and transmitted by the antenna, and the receiving antenna receives the signal, the signal is then amplified, and enters the high voltage field after being detected by the envelope detector.

Figure 5:
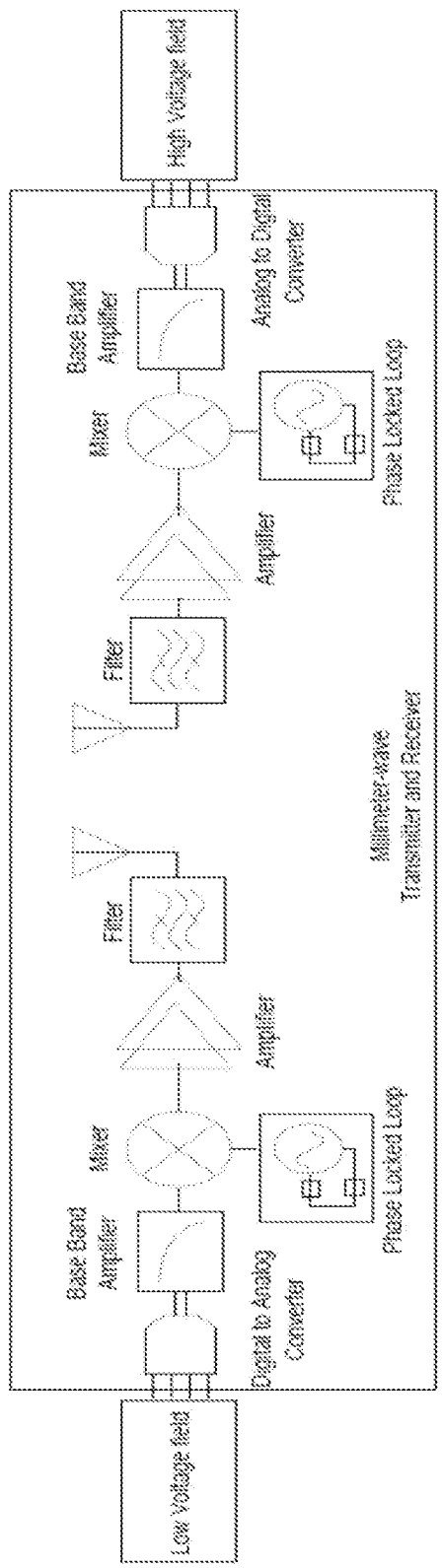
FIG. 5 is a schematic structural diagram of a first circuit of a millimeter-wave isolation device according to an embodiment of the present invention.
Figure 6:
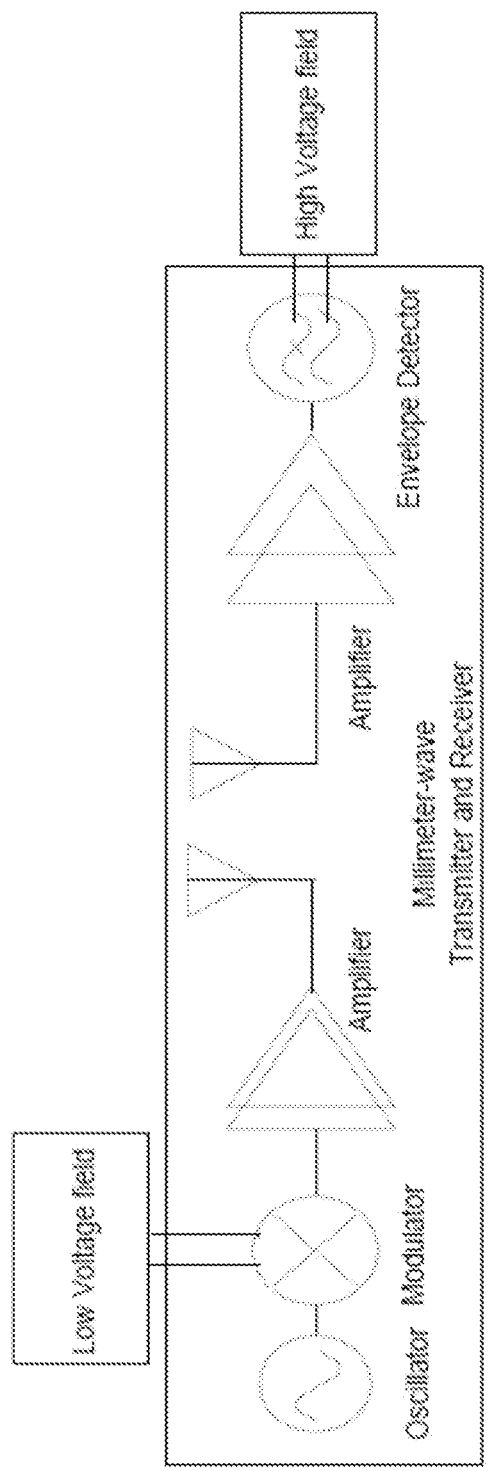
FIG. 6 is a schematic structural diagram of a second circuit of a millimeter-wave isolation device according to an embodiment of the present invention.

FIG. 5 and FIG. 6 illustrate the circuit structural diagrams of the above-mentioned two different millimeter-wave transmitting circuits applied to the high voltage circuit. In FIG. 5, the low voltage field signal is inputted into the input end of the digital to analog converter, and the outputted signal of the digital to analog converter is inputted into the high voltage circuit. In FIG. 6, the low voltage field signal is inputted into the second input end of the modulator, and the output signal of the envelop detector is inputted into the high voltage field circuit.

In another optional implementation mode, the millimeter-wave transceiver is a millimeter-wave transceiver chip.

Figure 7:
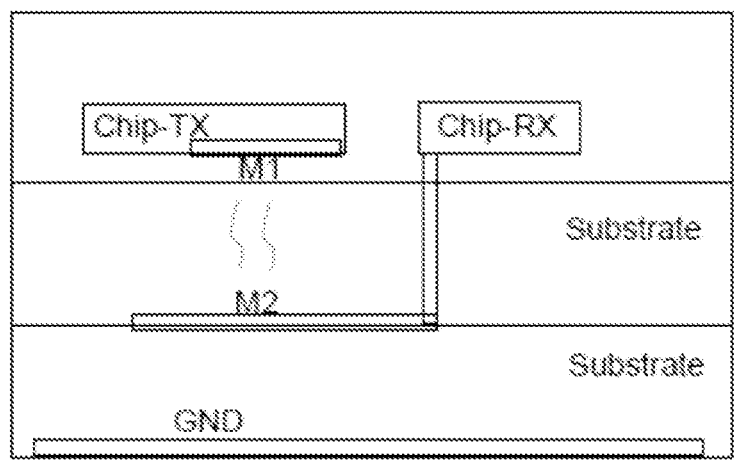
FIG. 7 is a schematic structural diagram of a first implementation mode of a millimeter-wave transceiver chip in a millimeter-wave isolation device according to an embodiment of the present invention.
Figure 8:
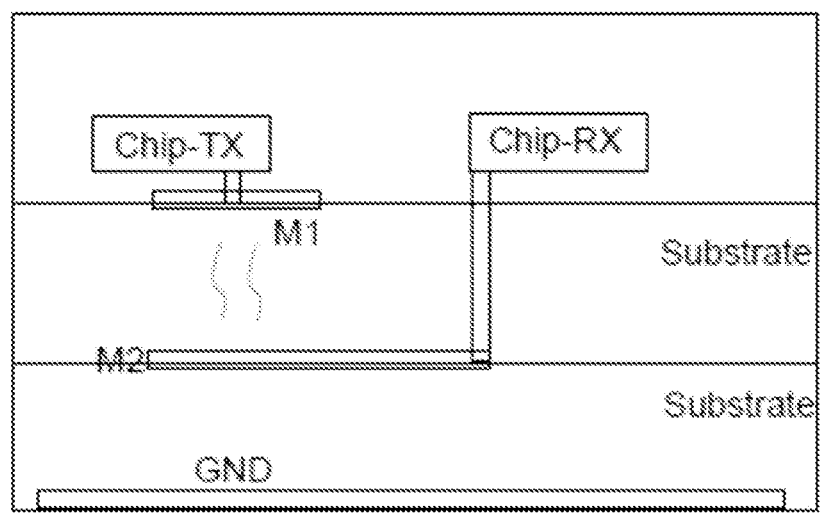
FIG. 8 is a schematic structural diagram of a second implementation mode of a millimeter-wave transceiver chip in a millimeter-wave isolation device according to an embodiment of the present invention.

Specifically, the millimeter-wave transceiver chip includes a millimeter-wave transmitting chip, a millimeter-wave receiving chip, a first substrate, a second substrate and a packaging layer, where the first substrate and the second substrate both are made of insulating materials;

the first substrate, the second substrate and the packaging layer are stacked successively;

a thickness of the packaging layer is 300-400 um, and a total thickness of the first substrate and the second substrate is 80-400 um;

the millimeter-wave transmitting chip and the millimeter-wave receiving chip are arranged in the packaging layer at an interval of 10 um-1000 um;

the transmitting antenna and the receiving antenna may be embedded into the chip, so that isolated transmission is achieved safely and reliably. The transmitting antenna and the receiving antenna may be embedded into the chip in various ways:

In an optional implementation mode, as shown in FIG. 7, the transmitting antenna M1 and the receiving antenna M2 are arranged parallelly, i.e., the two are perpendicularly isolated, where a positional relationship therebetween may be interchangeable;

the transmitting antenna M1 is arranged in the millimeter-wave transmitting chip Chip-TX, and the receiving antenna M2 is arranged in the second substrate. Specifically, the transmitting antenna M1 is arranged on a side of the millimeter-wave transmitting chip Chip-TX close to the second substrate, and the receiving antenna M2 is arranged in a side of the second substrate close to the first substrate. It can be seen from FIG. 7 that the transmitting antenna M1 and the receiving antenna M2 are in a parallel relationship. An earthing unit is arranged in the first substrate and is arranged on a side of the first substrate away from the second substrate. In another optional implementation mode, the transmitting antenna M1 is arranged in the second substrate and the receiving antenna M2 is arranged in the millimeter-wave transmitting chip Chip-TX;

In another optional implementation mode, one of the transmitting antenna and the receiving antenna is arranged in the packaging layer, and the other one is arranged in the second substrate;

as shown in FIG. 8, the transmitting antenna M1 is arranged on a side of the packaging layer close to the second substrate, the receiving antenna M2 is arranged on a side of the second substrate close to the first substrate, and the earthing unit is arranged in the first substrate and is arranged on a side of the first substrate away from the second substrate. The positions of the transmitting antenna M1 and the receiving antenna M2 may be interchangeable;

or, the transmitting antenna M1 may be arranged on a side of the second substrate close to the first substrate, the receiving antenna M2 may be arranged on a side of the packaging layer close to the second substrate, and the earthing unit is arranged in the first substrate and is arranged on a side of the first substrate away from the second substrate:

The above-mentioned various arrangement modes of the antennas are based on perpendicularly isolated antenna architectures. Since millimeter-waves are high in frequency, the antennas are relatively small in size. As the antennas are suitably designed in the substrate or chip as a result of size, one of the antennas may be designed as a chip antenna and the other one is designed as a substrate antenna. Either transmitting antenna or the receiving antenna both may be a patch antenna, a loop antenna, a helix antenna, an aperture antenna, a waveguide antenna, a slot antenna, a dipole antenna or a monopole antenna. By using the substrate as an insulating material, isolation may be realized well. It is realized through the antennas and the antennas may be further embedded into the chip. Therefore, the millimeter-wave transceiver chip may be prepared by adopting a standard CMOS process and a standard packaging process with low cost and high reliability.

Figure 9:
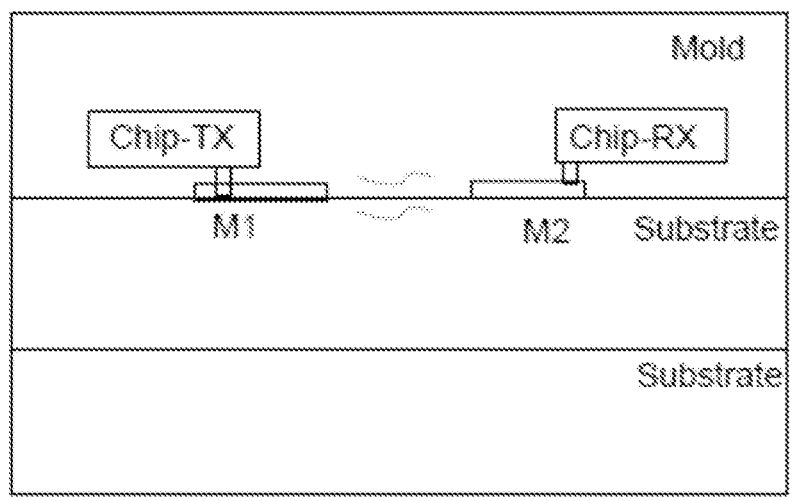
FIG. 9 is a schematic structural diagram of a third implementation mode of a millimeter-wave transceiver chip in a millimeter-wave isolation device according to an embodiment of the present invention.

In another optional implementation, a lateral radiation type antenna architecture mode may be further adopted. The transmitting antenna and the receiving antenna are horizontally arranged at an interval in the packaging layer;

as shown in FIG. 9, the transmitting antenna M1 and the receiving antenna M2 are separately arranged on a side of the packaging layer close to the second substrate at an interval of 10 um-100 kum;

In the implementation mode, the M1 and the M2 are isolated by using the packaging layer and the distance between the M1 and the M2 as the insulating material.

Figure 10:
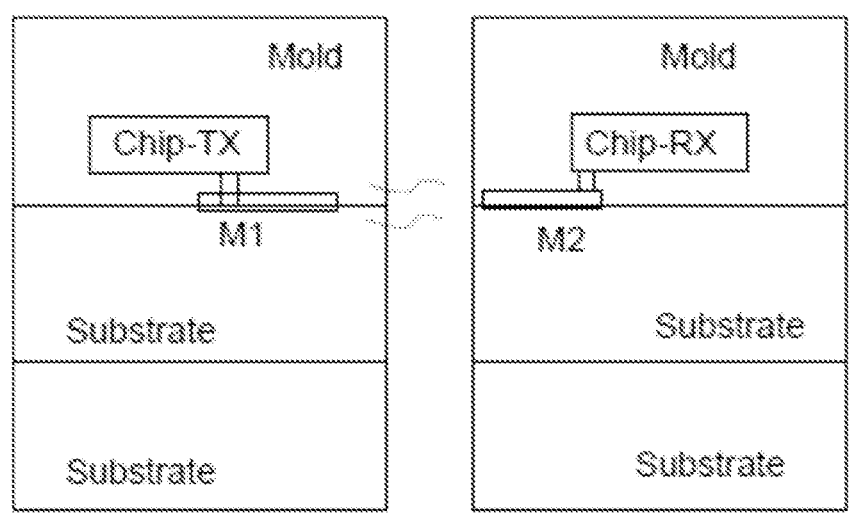
FIG. 10 is a schematic structural diagram of a fourth implementation mode of a millimeter-wave transceiver chip in a millimeter-wave isolation device according to an embodiment of the present invention.
Figure 11:
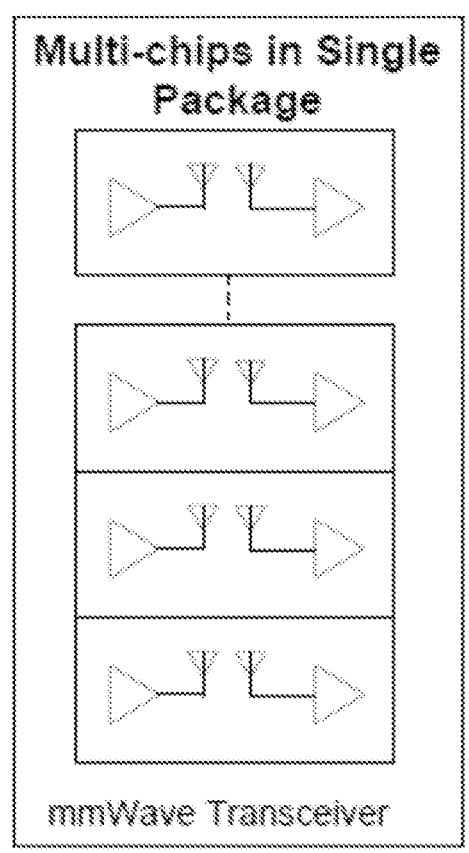
FIG. 11 is a schematic structural diagram of a plurality of millimeter-wave transceiver chips of a millimeter-wave transceiver chip integrated to a same packaging structure according to an embodiment of the present invention.

In another optional implementation mode, the millimeter-wave transceiver chip includes two sets of independent chip packaging structures, i.e., the millimeter-wave transmitting chip and the millimeter-wave receiving chip are in single packaging designs respectively;

specifically, as shown in FIG. 10, the two sets of chip packaging structures are arranged at an interval of 10 um-100 kum; the millimeter-wave transmitting chip is packaged in one of the chip packaging structures and the millimeter-wave receiving chip is packaged in the other chip packaging structure;

the millimeter-wave transmitting chip and the millimeter-wave receiving chip are respectively and independently packaged in packaging layers of the corresponding chip packaging structures;

the transmitting antenna is arranged in the packaging layer of the chip packaging structure where the millimeter-wave transmitting chip is locate; specifically, the transmitting antenna is arranged on a side of the packaging layer close to the first substrate;

the receiving antenna is arranged in the packaging layer of the chip packaging structure where the millimeter-wave receiving chip is located; specifically, the receiving antenna is arranged on a side of the packaging layer close to the first substrate;

in the implementation mode, the millimeter-wave transmitting chip and the millimeter-wave receiving chip are packaged by way of the single packaging designs, so that on the one hand, the cost is lower and on the other hand, the isolation effect is better by utilizing a distance between air and an object as the insulation layer;

the above-mentioned lateral radiation type (endfire) antenna architecture mode, either the transmitting antenna or the receiving antenna may be a dipole antenna, a monopole antenna, a helix antenna, a loop antenna, an aperture antenna, a waveguide antenna, a slot antenna or a patch antenna;

in another optional implementation mode, in product packaging, as shown in FIG. 11, a plurality of chips may be integrated to the single packaging structure to realize a better integration level design.

Figure 12:
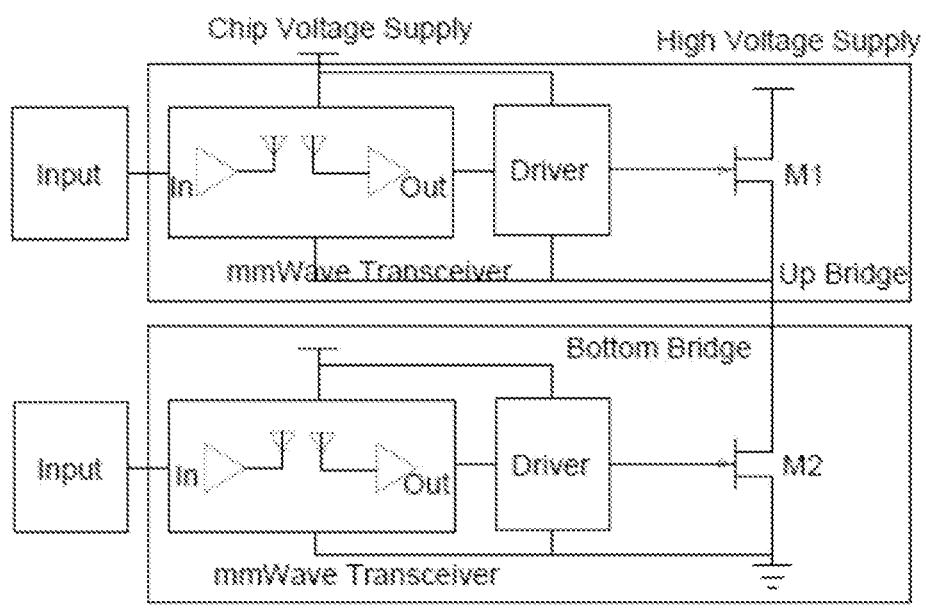
FIG. 12 is a schematic structural diagram of a millimeter-wave isolation device applied to a high voltage bridge circuit according to an embodiment of the present invention.

In another optional implementation mode, the above-mentioned millimeter-wave isolation device may be applied to a high voltage bridge circuit. As shown in FIG. 12, the first isolated circuit is a control signal circuit of an up bridge in the high voltage bridge circuit and a control signal circuit of a bottom bridge in the high voltage bridge circuit; and the second isolated circuit is a high voltage device of the bottom bridge in the high voltage bridge circuit and a high voltage device of the bottom bridge in the high voltage bridge circuit;

the signal enters the millimeter-wave transmitter and is then transmitted to the millimeter-wave receiver through the antennas, and then the millimeter-wave receiver transmits the signal to the high voltage devices M1 and M2 so as to drive the high voltage devices.

In conclusion, the present invention provides a millimeter-wave isolation device. The first isolated circuit and the second isolated circuit are isolated by virtue of the millimeter-wave transceiver. The millimeter-wave isolation device can be applicable to any scenario, for example, the high voltage circuit, the high voltage bridge circuit, the switch power supply and the like. By adopting a short distance transmission mode with millimeter-waves taken as carrier waves, the bandwidth can reach 200 kHz to 20 GHz, and a transmission speed can reach 100 kbps to 10 Gbps. The speed is high, whereby the millimeter-wave isolation device can be applicable to any scenario. The millimeter-wave carrier wave antenna is small, and through the antenna, either wireless transmission or signal isolation can be achieved. By designing the chip, integration may be realized well without a photo coupler or an extra isolation layer. The product production may be carried out by adopting the standard CMOS process and the standard packaging process with low production cost. The standardized packaging process is likely to be integrated in a consumer good product. Moreover, even if a product is broken through, the antenna will not lead to metal short circuit, so that it can be guaranteed that signals feature high transmission speed, small delay and high efficiency while good isolation is achieved, and it is safer.

The above is merely embodiments of the present invention and does not hence limit the patent scope of the present invention. Equivalent conversions made by means of the contents of the description and drawings of the present invention are applied to other related technical fields directly or indirectly, which is, in a similar way, comprised in the protection scope of the patent of the present invention.

What is claimed is:

1. A millimeter-wave isolation device, comprising a first isolated circuit and a second isolated circuit and further comprising a millimeter-wave transceiver, wherein
   an output end of the first isolated circuit is connected to an input end of the millimeter-wave transceiver; and
   an output end of the millimeter-wave transceiver is connected to an input end of the second isolated circuit.

2. The millimeter-wave isolation device according to claim 1, wherein the millimeter-wave transceiver comprises a millimeter-wave transmitting circuit, a millimeter-wave receiving circuit, a transmitting antenna and a receiving antenna;
   the output end of the first isolated circuit is connected to an input end of the millimeter-wave transmitting circuit;
   an output end of the millimeter-wave transmitting circuit is connected to the transmitting antenna;
   an input end of the millimeter-wave transmitting circuit is connected to the receiving antenna; and
   an output end of the millimeter-wave receiving circuit is connected to the input end of the second isolated circuit.

3. The millimeter-wave isolation device according to claim 2, wherein the millimeter-wave transmitting circuit comprises a digital to analog converter, a first base band amplifier, a first mixer, a first phase locked loop, a first radio frequency amplifier and a first filter;
   the millimeter-wave receiving circuit comprises a second filter, a second radio frequency amplifier, a second mixer, a second phase locked loop, a second base band amplifier and a digital to analog converter;
   an input end of the digital-to-analog converter is connected to the output end of the first isolated circuit and an output end thereof is connected to a first input end of the first mixer;
   a second input end of the first mixer is connected to an output end of the first phase locked loop and an output end thereof is connected to a first input end of the second radio frequency amplifier;
   an output end of the first radio frequency amplifier is connected to an input end of the first filter;
   an output end of the first filter is connected to the transmitting antenna;
   an input end of the second filter is connected to the receiving antenna and an output end thereof is connected to a first input end of the second mixer;
   a second input end of the second mixer is connected to an output end of the second phase locked loop and an output end thereof is connected to an input end of the second base band amplifier;
   an output end of the second base band amplifier is connected to an input end of the analog digital converter; and
   the output end of the analog digital converter is connected to the input end of the second isolated circuit.

4. The millimeter-wave isolation device according to claim 2, wherein the millimeter-wave transmitting circuit comprises an oscillator, a modulator and a third radio frequency amplifier;
   the millimeter-wave receiving circuit comprises a fourth radio frequency amplifier and an envelope detector;
   an output end of the oscillator is connected to a first input end of the modulator;
   a second input end of the modulator is connected to an output end of the first isolated circuit and an output end thereof is connected to an input end of the third radio frequency amplifier;
   an output end of the third radio frequency amplifier is connected to the transmitting antenna;
   an input end of the fourth radio frequency amplifier is connected to the receiving antenna and an output end thereof is connected to an input end of the envelope detector; and
   an output end of the envelope detector is connected to the input end of the second isolated circuit.

5. The millimeter-wave isolation device according to claim 1, wherein the millimeter-wave transceiver is a millimeter-wave transceiver chip.

6. The millimeter-wave isolation device according to claim 5, wherein the millimeter-wave transceiver chip comprises a millimeter-wave transmitting chip, a millimeter-wave receiving chip, a first substrate, a second substrate and a packaging layer;
   the first substrate, the second substrate and the packaging layer are stacked successively;
   the millimeter-wave transmitting chip and the millimeter-wave receiving chip are arranged in the packaging layer at an interval;
   the transmitting antenna and the receiving antenna are arranged parallelly;
   the transmitting antenna is arranged in the millimeter-wave transmitting chip, and the receiving antenna is arranged in the second substrate;
   or the transmitting antenna is arranged in the second substrate, and the receiving antenna is arranged in the millimeter-wave receiving chip;
   or one of the transmitting antenna and the receiving antenna is arranged in the packaging layer, and the other one is arranged in the second substrate.

7. The millimeter-wave isolation device according to claim 6, wherein the transmitting antenna and the receiving antenna are horizontally arranged in the packaging layer at an interval.

8. The millimeter-wave isolation device according to claim 6, wherein the millimeter-wave transceiver chip comprises two sets of independent chip packaging structures;
   the two sets of chip packaging structures are arranged at an interval;
   the millimeter-wave transmitting chip and the millimeter-wave receiving chip are respectively and independently packaged in packaging layers of the corresponding chip packaging structures;
   the transmitting antenna is arranged in the packaging layer of the chip packaging structure where the millimeter-wave transmitting chip is located; and
   the receiving antenna is arranged in the packaging layer of the chip packaging structure where the millimeter-wave receiving chip is located.

9. The millimeter-wave isolation device according to claim 6, wherein either the transmitting antenna or the receiving antenna is a patch antenna, a loop antenna, a helix antenna, an aperture antenna, a waveguide antenna, a slot antenna, a monopole antenna or a dipole antenna.

10. The millimeter-wave isolation device according to claim 1, wherein the first isolated circuit is a low voltage field circuit of a high voltage circuit, and the second isolated circuit is a high voltage field circuit of the high voltage circuit.

11. The millimeter-wave isolation device according to claim 1, wherein the first isolated circuit is a control signal circuit of an up bridge in a high voltage bridge circuit and a control signal circuit of a bottom bridge in the high voltage bridge circuit, and the second isolated circuit is a high voltage device of the up bridge in the high voltage bridge circuit and a high voltage device of the bottom bridge in the high voltage bridge circuit.

\* \* \* \* \*